United States Patent
Gennermann et al.

(10) Patent No.: US 10,589,718 B2
(45) Date of Patent: Mar. 17, 2020

(54) SYSTEM AND METHOD FOR CONTROLLING ACCESS

(71) Applicant: Huf Huelsbeck & Fuerst GmbH & Co. KG, Velbert (DE)

(72) Inventors: Sven Gennermann, Velbert (DE); Daniel Bambeck, Essen (DE); Uwe Kaeufer, Duisburg (DE)

(73) Assignee: Huf Huelsbeck & Fuerst GmbH & Co. KG, Velbert (DE)

( * ) Notice: Subject to any disclaimer, the term of this patent is extended or adjusted under 35 U.S.C. 154(b) by 0 days.

(21) Appl. No.: 15/311,745

(22) PCT Filed: Jan. 13, 2015

(86) PCT No.: PCT/EP2015/050471
§ 371 (c)(1),
(2) Date: Nov. 16, 2016

(87) PCT Pub. No.: WO2015/176826
PCT Pub. Date: Nov. 26, 2015

(65) Prior Publication Data
US 2017/0096123 A1   Apr. 6, 2017

(30) Foreign Application Priority Data

May 22, 2014   (DE) .......................... 10 2014 107 242

(51) Int. Cl.
*G06F 15/173* (2006.01)
*B60R 25/24* (2013.01)
(Continued)

(52) U.S. Cl.
CPC ............ *B60R 25/241* (2013.01); *E05B 81/54* (2013.01); *G07C 9/00309* (2013.01);
(Continued)

(58) Field of Classification Search
CPC ........... G07C 2009/00825; G07C 2009/00841; G07C 2009/0088; G07C 2009/0019;
(Continued)

(56) References Cited

U.S. PATENT DOCUMENTS

| 6,072,402 A | 6/2000 | Kniffin et al. |
| 6,204,570 B1 * | 3/2001 | Muller .................... B60R 25/24 180/287 |

(Continued)

FOREIGN PATENT DOCUMENTS

| CN | 101416233 A | 4/2009 |
| CN | 101620750 A | 1/2010 |

(Continued)

OTHER PUBLICATIONS

International Preliminary Report on Patentability of International Application No. PCT/EP2015/050471 dated Nov. 22, 2016, 15 pages.

(Continued)

*Primary Examiner* — Hai Phan
*Assistant Examiner* — Son M Tang
(74) *Attorney, Agent, or Firm* — Fay Sharpe LLP

(57) ABSTRACT

A method for controlling access of a user to a physical device which is provided with an access control unit that can block and release access to functions of the physical device includes the provision of a central control platform and a mobile access device. An identification check of the user is carried out, the user being identified by the mobile access device. Following a successful identification check, a wireless communication link is established between the mobile access device and the access control unit of the physical device. Identification information and unique access data are transmitted from the mobile access device to the access control unit. The access control unit ascertains the access (Continued)

rights of the user to the physical device using the received information and additional information from the central control platform.

8 Claims, 3 Drawing Sheets

(51) Int. Cl.
*G07C 9/00* (2020.01)
*E05B 81/54* (2014.01)

(52) U.S. Cl.
CPC .... *G07C 9/00571* (2013.01); *B60R 2325/101* (2013.01); *B60R 2325/205* (2013.01)

(58) Field of Classification Search
CPC ............ G07C 2209/12; G07C 9/00309; G07C 9/00571; B60R 25/241; B60R 25/25; B60R 2325/101; B60R 2325/205; E05B 81/54; G06F 15/173
See application file for complete search history.

(56) References Cited

U.S. PATENT DOCUMENTS

| | | | |
|---|---|---|---|
| 6,535,107 B1 | 3/2003 | Bartz | |
| 8,063,734 B2* | 11/2011 | Conforti | G07C 9/00103 340/5.1 |
| 8,354,913 B2* | 1/2013 | Solomon | G06F 21/31 340/5.2 |
| 8,421,592 B1* | 4/2013 | Gunasekara | H04L 63/18 320/104 |
| 8,593,252 B2* | 11/2013 | Fisher | G07C 9/00571 235/382 |
| 8,922,356 B2* | 12/2014 | Lambert | G07C 5/008 340/426.1 |
| 8,943,187 B1* | 1/2015 | Saylor | H04L 67/306 709/223 |
| 8,971,857 B2* | 3/2015 | Nishidai | H04W 12/06 340/426.17 |
| 9,218,696 B2* | 12/2015 | Dumas | G07C 9/00571 |
| 9,501,881 B2* | 11/2016 | Saeedi | G07C 9/00087 |
| 9,509,496 B2* | 11/2016 | Kawamura | B60R 25/24 |
| 9,922,477 B2 | 3/2018 | Kerning et al. | |
| 2003/0046541 A1* | 3/2003 | Gerdes | G06F 21/31 713/168 |
| 2004/0186995 A1* | 9/2004 | Yim | G08C 17/02 713/168 |
| 2004/0203379 A1* | 10/2004 | Witkowski | H04L 12/66 455/41.2 |
| 2006/0143463 A1* | 6/2006 | Ikeda | B60R 25/04 713/182 |
| 2006/0170533 A1 | 8/2006 | Chioiu et al. | |
| 2007/0200665 A1 | 8/2007 | Studerus | |
| 2009/0051484 A1* | 2/2009 | Foster | G08C 17/02 340/5.7 |
| 2009/0251279 A1 | 10/2009 | Spangenberg et al. | |
| 2010/0075655 A1* | 3/2010 | Howarter | B60R 25/2009 455/420 |
| 2011/0156865 A1* | 6/2011 | Baek | G07C 9/00563 340/5.53 |
| 2012/0130891 A1* | 5/2012 | Bogaard | G07B 15/02 705/40 |
| 2012/0164989 A1 | 6/2012 | Xiao et al. | |
| 2012/0254960 A1* | 10/2012 | Lortz | H04L 63/104 726/7 |
| 2013/0259232 A1 | 10/2013 | Petel | |
| 2014/0375422 A1 | 12/2014 | Huber et al. | |
| 2015/0067792 A1* | 3/2015 | Benoit | H04W 12/04 726/5 |
| 2015/0213661 A1 | 7/2015 | Robertson et al. | |
| 2015/0221152 A1 | 8/2015 | Andersen | |
| 2015/0294518 A1* | 10/2015 | Peplin | B60R 25/23 340/5.22 |
| 2015/0363986 A1* | 12/2015 | Hoyos | G07C 9/00571 340/5.61 |

FOREIGN PATENT DOCUMENTS

| | | |
|---|---|---|
| CN | 101625773 A | 1/2010 |
| CN | 101934779 A | 1/2011 |
| CN | 103201996 A | 7/2013 |
| CN | 103328278 A | 9/2013 |
| CN | 103329173 A | 9/2013 |
| DE | 101 56 737 A1 | 1/2004 |
| DE | 102 37 831 A1 | 2/2004 |
| DE | 10 2010 037 271 A1 | 2/2012 |
| DE | 10 2011 078 018 A1 | 12/2012 |
| DE | 10 2012 012 389 A1 | 1/2013 |
| DE | 10 2011 118 224 A1 | 5/2013 |
| DE | 10 2012 013 450 A1 | 1/2014 |
| EP | 1 965 595 A1 | 9/2008 |
| EP | 2 493 232 A1 | 8/2012 |
| EP | 2 575 091 A1 | 4/2013 |
| EP | 1 910 134 B1 | 5/2013 |
| WO | WO 2007/009453 A2 | 1/2007 |

OTHER PUBLICATIONS

International Search Report of International Application No. PCT/EP2015/050471 dated Apr. 9, 2015, 6 pages.
https://de.wikipedia.org/w/index.php?title=IPhone_5s&oldid=125973069, "I Phone 5s", Sep. 2, 2017, 2 pages (and English translation, 18 pages).
http://www.androidcentral.com/face-unlock-jelly-bean-gets-liveness-check, "Face Unlock in Jelly Bean gets a 'Liveness check'", Feb. 15, 2017, 3 pages.

* cited by examiner

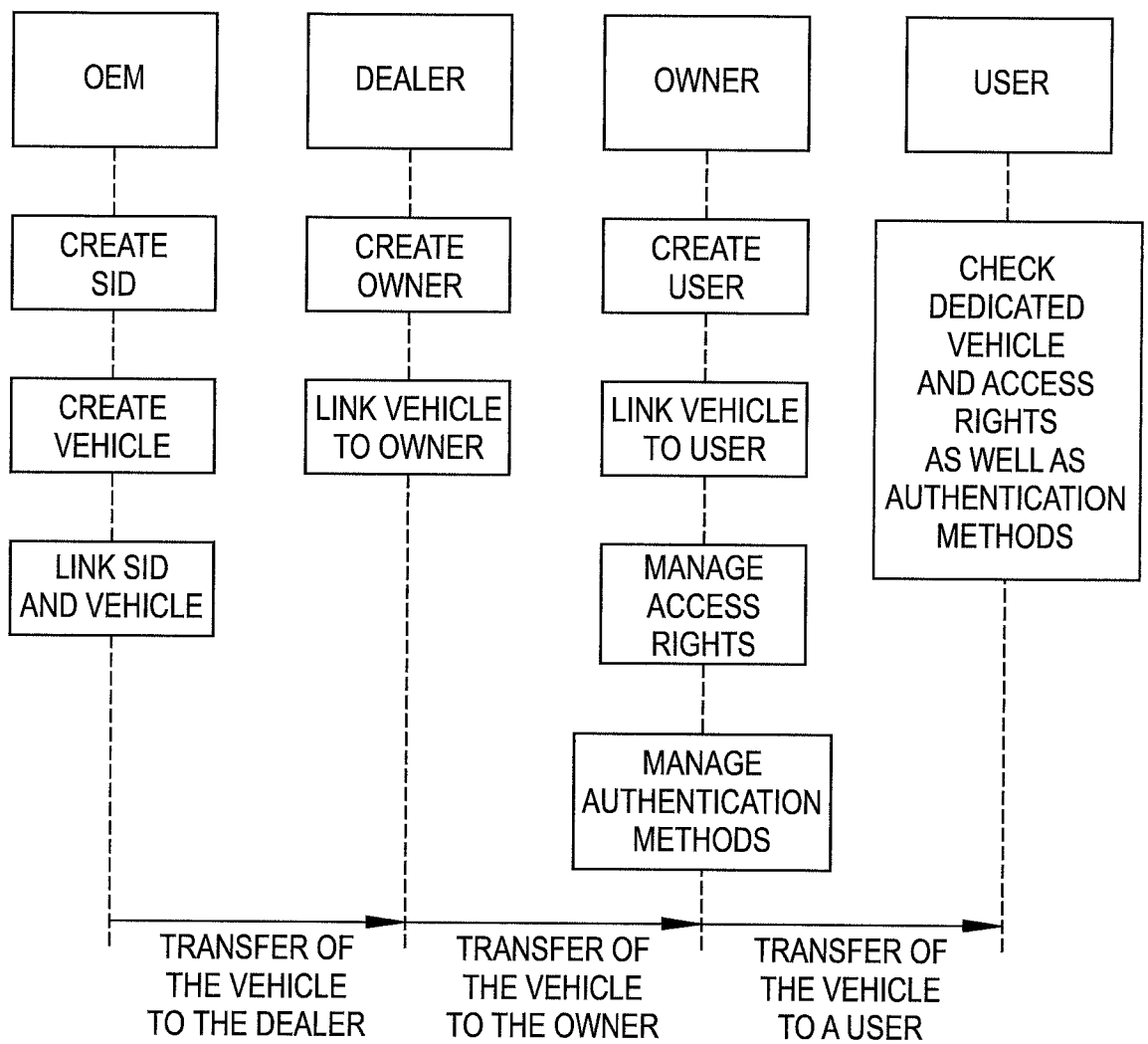

SYSTEM AND METHOD FOR CONTROLLING ACCESS

BACKGROUND

The invention relates to a system and a method for controlling access by individuals to physical units. In particular, the invention relates to a system and a method, with which individual access privileges can be allotted to individuals and managed.

The management of access rights or rights of use can be found in the field of technology in many places. By way of example, there are complex access rights hierarchies and schematics in the management of access privileges in computer systems. There, an individual identified by the computer system by means of a secret ID or biometric data, is granted access to services or data of the computer system. If, however, the granted rights or privileges are not sufficient for carrying out a requested action, this action is prevented through technical measures.

Furthermore, locking systems are known, with which a locking means is identified for controlling access, in order to check access to a function, e.g. access to a domain. With systems of this type, it is frequently assumed that the carrier of the locking means is also the authorized party for requesting the respective function. Corresponding concepts can also be found in the field of vehicle locking systems, in particular with keyless entry and keyless go systems. There, a user carries a vehicle key, referred to as an ID transmitter. This ID transmitter contains encoded data, by means of which a vehicle can verify the authorization of the ID transmitter (not necessarily the carrier of the ID transmitter) to exercise functions. Therefore, if the ID transmitter is given to another user, then the other user is likewise able to execute and actuate the vehicle functions with the ID transmitter.

In the field of access systems for vehicles, numerous different management systems are known for allowing access to vehicles. By way of example, US 2013/0259232 A1 describes a system for coupling or pairing a cellular telephone to a vehicle, in order to be able to activate vehicle functions with the cellular telephone.

DE 10 2011 078 018 A1 describes another system for executing vehicle functions, wherein a telematics center carries out a part of the communication with the vehicle.

US 2012/0164989 relates to another method and system for a wireless locking function for a vehicle.

EP 1 910 134 B1 describes a system having a central management, which distributes data packages as a key to mobile access devices.

The known systems and methods, which enable access to technical devices, have disadvantages, however. With some of the systems, it is possible to generate or call up an authorization for access to technical devices, or to execute functions with technical devices, such as computers, smartphones or suchlike, such that attackers can obtain unauthorized access to devices (e.g. vehicles) or their functions.

The object of the invention is to provide a secure and flexible system and method, in order to enable an expanded privileges management for access to physical units.

BRIEF SUMMARY

In accordance with the invention, a system and a method are proposed, with which a central control platform (Secure Access Platform) assumes a substantial control function as the first component. The central control platform is provided with information regarding privileges (rights)) of identified users. This central control platform can be implemented, for example, by means of a database connected to a data network. A communication channel from remote locations to the central control platform can be established via the data network (internet, mobile communications network, etc.)

On the part of the physical unit, with respect to which the distribution of access or privileges is to be regulated, a second component is provided for in the design of a technical access control unit (Smart Identity Device), which can limit or enable access to functions of the physical unit. In the case of a vehicle, an access control unit is thus coupled to the vehicle system, for example, such that the access control unit can enable or prevent locking functions or the motor start-up, or other functions, in a targeted manner. This device is coupled with communication means, in order to connect to the central control platform, and to exchange data. These communication means comprise such devices that enable a wireless connection via established communication networks, in particular via mobile communications networks.

Furthermore, as a third component, a mobile electronic access unit is provided as a part of the system, which can communicate on its part with both the central control platform as well as the access control unit on the controlled physical device, in order to exchange data. This mobile electronic access device can be implemented, for example, in a portable computer or a mobile communications device, e.g. a smartphone. For this, the smartphone or the computer may be provided with an associated application software, which processes communication with the central control platform, and allows a user interaction. In turn, a communication channel can likewise be established between the mobile access device and the physical unit monitored with regard to the access thereof, or the access control unit thereof, e.g. by means of a wireless connection in accordance with a wireless network standard, by means of a Bluetooth interface, or via a near field communication, e.g. an NFC interface.

In accordance with the invention, a quadrilateral relationship is established with regard to the formation of communication relationships and data transport, in which, on one hand, the control platform can communicate with both the mobile access device as well as the access control unit of the controlled physical unit. The user on his part interacts with the mobile access device. The user also interacts, in some cases, with the central platform through separate communication channels (e.g. a computer with an internet connection). The identity of the user is a key component, which enables the interaction of the other components, wherein the identity is checked in a variety of steps. These communications between the various components do not necessarily occur simultaneously, but it is essential that the fundamental communication possibilities of these three components are provided on a reciprocal basis. This concept ensures a verification of data received from one of the transmissions with an independent body. As described below, this reciprocal relationship, in combination with the special features of the mobile access device, ensures access in a particularly secure and reliable manner.

A user of the system and method according to the invention has access to the mobile access device, i.e. to a smartphone, for example, having an application installed thereon. Even when the user is able to use this device to communicate with the vehicle-side access control unit, the vehicle-side access control unit would not necessarily allow access to the vehicle, because the necessary verification would be lacking. The vehicle specifically does not accept merely the identity of the mobile access device as a verification, but rather, it accepts this only in combination with the verified identity of the user. This identification check is successful only in that the mobile access device receives data from the central platform, which identify the mobile access device and the person identified therewith as the legitimate user of the physical unit.

The invention organizes the management of privileges and the controlled physical units in the control platform. In this manner, this management prevents manipulation by unauthorized persons, because only trusted bodies may make changes in the central control platform. It is not sufficient to manipulate the data of a mobile device, because the access control device verifies the authorization data via the connection to the central platform.

The central control platform may contain data regarding human individuals, which are confirmed in a reliable manner to this control platform. The central control platform can, however, also manage rights to dedicated access control units assigned to anonymous IDs, such that there are no links to real persons in the central control platform, but only anonymous IDs.

While identification in conventional access systems or access management systems occurs by means of an appropriate utensil, a tag, key, keycard, or suchlike, in accordance with the invention, the privileges are allotted to persons or unique IDs, and managed. Independently of which means the person uses to confirm his identity to the central control platform or the access device, a privilege assignment is not tied to such a means (telephone, key, etc.), but rather, to the identified person or identified ID.

It is essential to the invention that rights assigned in the central control platform to the identity of a person or an anonymous ID, are stored. These rights relate, respectively, to sub-quantities of the access control units that are managed by the central platform. Thus, by way of example, rights may be granted to an ID, which applies to groups or even all of the access control units assigned thereto. Other rights may be assigned to individual access control units. In the example of a control for a fleet of cars, this means that a member of the management personnel is allotted the vehicle opening rights for all of the vehicles in the fleet, but only given the right to start up a vehicle for certain vehicles, for example.

Accordingly, it is necessary to first input an entry regarding the identity or the anonymous ID of a reliable user in the central control platform. These entries can be managed in the conventional manner, using a database, which provides an interface for queries. The acquisition of IDs can also occur via an interface to other systems, e.g. systems from rental car agencies, security agencies, or car-sharing agencies. While the coupled systems of the other agencies know the identities of their customers, they only transmit, e.g., an anonymous ID and the associated rights to the central platform. Personal data then remain with the contracting partner, and the central platform only manages the rights on the basis of the ID.

The mobile access device can enter a data communication with the central control platform. The central control platform provides information to the mobile access device which enable a legitimation to the access control unit of a physical unit. For example, this can be a certificate which is issued by the central control platform.

The mobile access device also serves to verify the identity of the bearer to an access control unit. The mobile access device is equipped for this such that a reliable identification of the user is possible. This identification of a user can be obtained, for example, via an ID known only to the user, or by retrieving biometric data, e.g. facial recognition, voice analysis, or fingerprinting. Access to the data in the mobile access device can only be accessed when this identification to the mobile access device is successful. The type of necessary identification can be dependent on the security pertaining to the requested rights. If a user needs to obtain, for example, vehicle data (mileage, fuel tank level, etc.) in the immediate vicinity of the vehicle, entering a PIN in the mobile device, or a special waving gesture across a control panel of the device may be sufficient. In order to start up the vehicle, a facial recognition, for example, is required. The type of identity check necessary for which type of privilege can be stored in the central platform.

If identification to the mobile access device is successful, a connection is established with the physical unit that is to be controlled, more precisely with the access control unit of the physical unit, and the access data, which are at least partially transmitted from the central control platform to the mobile access device, are used in order to access the functions of the physical unit.

The connection according to the invention, of the access control unit, on the part of the physical unit, with the central control platform goes into effect thereby. As a result of this connection, it is possible for the access control unit to verify, on the part of the physical unit, whether the access data transmitted from the mobile access device are actually legitimate access data for the requested functions. Conventional systems do not have such a connection, and must rely accordingly, solely on the checking of data by the mobile access device.

The central control platform knows both the units participating in the verification procedure, as well the privileges assigned to a person identified by these units. The central control platform knows, on one hand, the identity or ID of a user, and on the other hand, the identity of the mobile access device and the identity of the access control unit in the physical unit. All of these devices are identified on the basis of unique features. Only the central control platform has all of the information necessary for enabling access to the central administration.

In a simple design of the invention, an ID is set up in the central platform, which identifies a user. Data for a mobile access device are stored and linked to the ID. By way of example, this can comprise an IMEI to a mobile device. Moreover, a set of access rights to the ID are stored in the central platform. This initial identification occurs, e.g. with an interconnection of a trusted body, e.g. an authority or a trusted service provider.

Prior to initial use, a message is sent from the central platform to the registered mobile device, which is to serve as the mobile access device. The user of the device is requested to perform an initial registration. The user then enters a series of data into the mobile device, which are then used later for an identity check. By way of example, a PIN is stored, and a waving gesture and biometrical comparison data are acquired (facial scan, voice sample, fingerprint, etc.). Once this has occurred, data can be retrieved from the central platform, and stored on the mobile access device. These data can contain, e.g., identification data, as well as data that verify the authenticity of the data. By way of example, the data can be signed with a certificate from the central platform, or encrypted. The system is subsequently operational.

If a user now wants to access a physical device, e.g. a vehicle, he must be in the vicinity of the physical unit with the dedicated access control unit. First, he must then identify himself to the mobile access device. The mobile access device only accesses the data stored in the mobile access device, and transmits the data pertaining to a requested right to the access control unit, which manages the rights to a physical unit, when this has been completed successfully. This transmission occurs via a wireless connection, e.g. by Bluetooth, or WLAN or NFC. On the part of the access control unit, it is checked whether the data are authentic. This shall be explained in greater detail below. The access control unit accesses data thereby that it has received directly from the central platform via the communications connection (immediately in the course of the current check of rights, or at an earlier point in time).

Extremely secure access limitations can be established through the reciprocal communication of the components explained above. Conventional systems were instructed to execute the authenticity check on the basis of data stored permanently in the access control unit. Certificates from trusted bodies, for example, are stored therein. The possibility according to the invention, of updating the data, including a live check, safeguards the access, because this communication channel is independent of the channel between the mobile access device and the central platform, and is also independent of data stored on the mobile access device, which could be manipulated.

Preferably, a key or certificate for access to a specific dedicated access control unit of a physical unit is transmitted to the mobile access device. A part of an asymmetrical key, for example, is transmitted to the dedicated access control device of the physical unit from the central platform, in order to verify the certificate. Conventional asymmetrical encryption methods, e.g. in accordance with the concept of public and private keys, can be used thereby.

The advantage of this type of access control is that, although there must be a connection between all of the communications participants with the central control platform, in particular for setting up and establishing the access rights, at a later point in time, however, it is also possible to temporarily control access and access functions without the participation of the central platform. By way of example, the central platform can transmit data to the mobile access device and the access control unit in the physical unit, which are provided with a certificate from the central control platform. In both the mobile access device as well as the physical unit and the access control unit, a certain certificate classification may be provided, e.g. those certificates issued by the central control platform, which in any case are trusted on a temporary basis, even when direct access to the central control platform is temporarily not possible. For this, the certificates may be provided with an expiration date, after expiration of which the certificates are no longer accepted for the reciprocal legitimation.

Thus, numerous different schematics regarding privileges to access different physical units may exist for a user identity or ID. By way of example, in the case of a use of the invention for controlling access to vehicles, different privileges may be allocated to one and the same identity for different vehicles, wherein, however, the same staff identity of the user is the connecting element. A comprehensive issuing of rights, or restriction of rights can also occur in the control platform, in the manner of a privileges management, e.g. a restriction regarding the type of use or the scope of use for a specific vehicle (e.g. the permitted maximum speed, independently of the vehicle used).

BRIEF DESCRIPTION OF THE DRAWINGS

The invention shall now be explained in greater detail, based on exemplary embodiments, which are shown in the accompanying drawings.

FIG. 2 shows a schematic for setting up and managing the central platform in accordance with a second exemplary embodiment of the invention.

DETAILED DESCRIPTION

Figure 1:
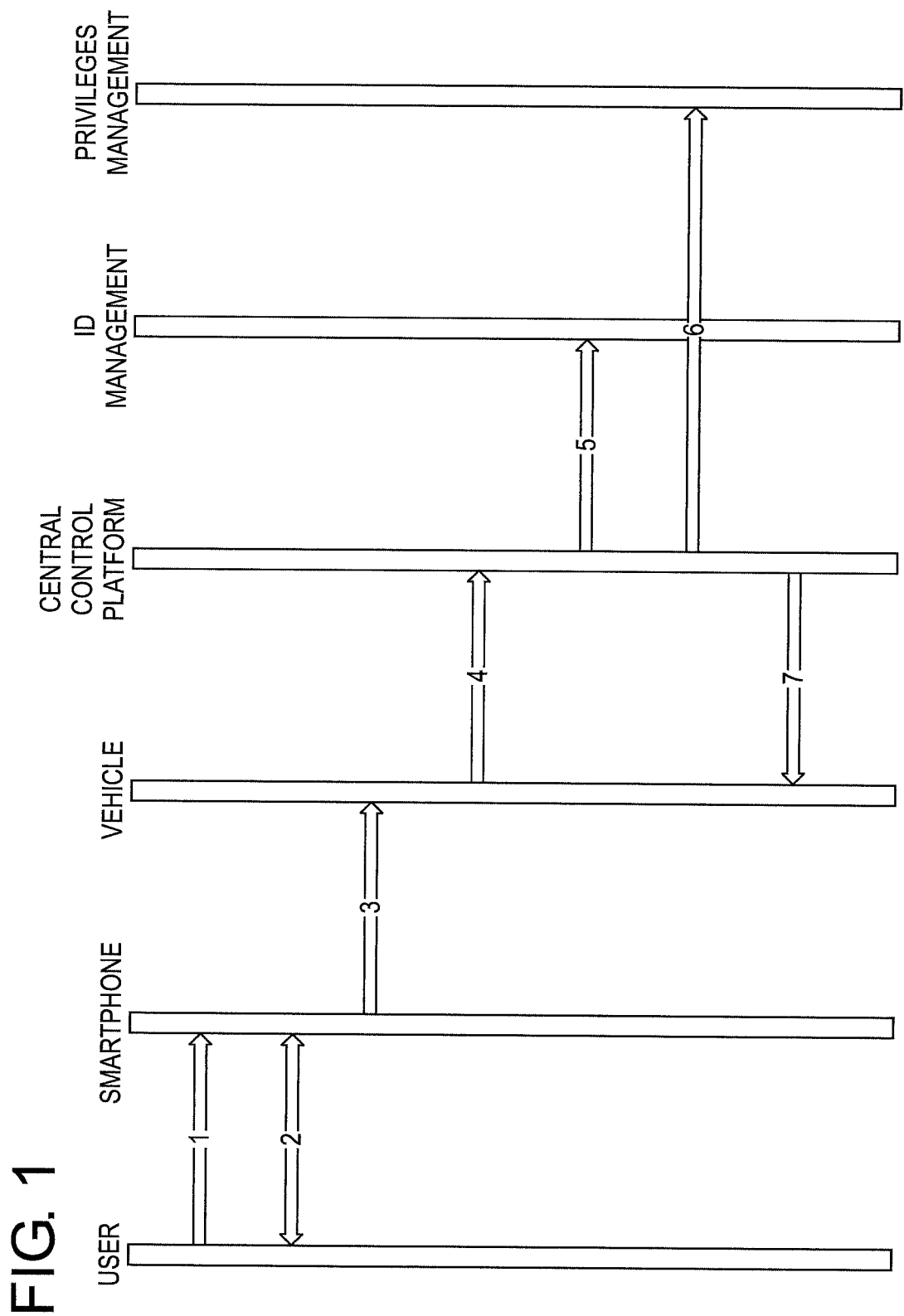
FIG. 1 shows a schematic for a communication sequence in accordance with a first exemplary embodiment of the invention.

The different stations and separate functional units are depicted symbolically in FIG. 1. The temporal sequence of the information flow and data exchange is depicted by arrows between these units. The controlled physical units in this example are vehicles, in which an access control unit is coupled to the central control system of the vehicle, which controls the rights for the vehicle functions, and can enable or block functions.

Before the method can run in the illustrated manner, a learning process must be carried out. This means that data regarding the user identities and the privileges, as well as the controlled vehicles, are to be provided to the central platform. This can occur, for example, in that a person identifies himself to a trusted body with suitable means of identification (e.g. passport, or personal identification card). This trusted body can be the automobile dealer, who carries out a personal identity check, and links a corresponding identity entry to an authorization for access to a specific vehicle.

These data are entered in a database, which can be accessed by the central control platform, by the vehicle dealer at the time of purchase, or maintenance. The important thing is that the identities and the privileges assigned to the identities are managed in the central control platform, and changes can only be made via the central control platform. The use of the central system can occur in the conventional manner, e.g. through management of a database by means of an input mask, which is depicted in an internet browser. The actual management behind the front end can be any type of database having suitable security.

In accordance with the invention, the privilege management thus takes place in a central location, specifically the central control platform. In addition, the access-controlled physical units, in this case the vehicles, are to be identified to the central control platform. For this, a unique vehicle identification is stored in the central control platform. With a fleet management, or a car-sharing concept, all of the vehicles can be stored as physical units in the central control platform. The vehicles are each assigned unique access control units, which can communicate with the central control platform.

Lastly, it is also essential that each of the mobile access devices is introduced to the central control platform. The mobile access device can be assigned a user or an ID in the central control platform thereby, thus linked thereto. This occurs, for example, such that a person identified to a trusted body registers the mobile access device, in this case a smartphone. By way of example, the telephone number is submitted. A message can then be sent from the trusted body to this telephone number, wherein the content of the message is then to be provided in turn to the trusted body by the identified person. As a result, a circle is closed, and it is verified that the submitted identification of the mobile access device actually belongs to the identified person.

The method according to the invention shall be described in terms of its application below, wherein reference is made to FIG. 1.

At the start of the method, a user in the vicinity of a vehicle, having the mobile device (e.g. smartphone or tablet), requests access to the vehicle through a user activity. The user entry, e.g. opening an application on a mobile device, is indicated by the communication arrow 1. The mobile access device then verifies the identity of the user, in that a facial recognition is carried out in this example (arrow 2). The user is to present his face to the camera integrated in the smartphone, and a software installed in the device compares the face with stored and authenticated biometric data.

If this authentication to the mobile device fails, the method terminates at this point, and an access attempt on the vehicle fails.

The verification of the identity can occur on the basis of encrypted data stored in the mobile device, such that the biometric data could be present in the mobile device, stored in an encrypted manner.

If the identification to the mobile device is successfully verified with the communication exchange 2, the mobile access device establishes contact with the vehicle, which can occur via a standard NFC interface or a Bluetooth connection. The mobile access unit establishes a connection to the access control unit of the vehicle at communication arrow 3. The mobile access unit requests, e.g., the actuation of a vehicle function, e.g. opening of a door, in this message.

The access control unit of the vehicle is then given the verified identity of the user from the mobile device. In accordance with this example, this happens using certificates issued by the central control platform, and stored in the smartphone. In particular, conventional certification procedures having public and private keys can be used for this. Thus, by way of example, there is an identity data in the mobile device, which is signed with the private key of the central control platform. The root certificate keys, in the form of the public key of the central control platform, are in the access control unit in the vehicle, similar to with an internet browser. Then, when the transmitted identity data is correct, certified data, the data regarding the identity can be decrypted and identified to the vehicle as correct.

With this identity data, the access control unit of the vehicle addresses the control platform at arrow 4, and asks about the access rights for this identity. The access control unit has a GSM module for this, in order to communicate with the central platform via a mobile telephone network. The control platform accesses both an identity administrator as well as a privileges administrator, which are coupled to the control platform, at arrows 5 and 6. These do not need to be at the same location as the central control platform. By way of example, there may be a central identity administrator in a car-sharing concept, which is maintained by numerous car-sharing providers in a comprehensive manner. The privileges assigned to these identities, thus the question of whether a person may access a specific vehicle in a car-sharing pool, can be stored at the respective companies. If there are different car-sharing companies, the central control platform can access a central identity administrator, depending on the questioning vehicle unit, and a special privileges pool of a specific car-sharing provider belonging to the identified vehicle. A certificate-based communication can likewise be used in the communication between the vehicle and the central control platform, in order to verify the authenticity of the communication partners.

It is thus determined in the central control platform, which privileges the identified person has regarding the vehicle. By way of example, the privileges can be formulated such that the person has full access rights to the vehicle for opening the doors and to start the motor. Alternatively, it may be the case that the identified person is a mechanic for a car-sharing provider, who fundamentally has the right to open all of the vehicles, but may not drive them at speeds over 20 km/h.

This information is sent back to the access control unit in the vehicle by the central control platform at 7, which issues appropriate settings or signals to the control system of the vehicle. Then, by way of example, a door unlocking is carried out by the control system, and the authorization to execute further vehicle functions is activated.

In summary, it is thus ensured that an identity check occurs, in order for the mobile access device to be able to be used at all. Secondly, the mobile access device is provided with an identification certified by the central control platform, ensuring security for all of the physical units controlled therewith.

The certificate in the smartphone may be provided with a short-term expiry in another design of this exemplary embodiment, such that the mobile access device must obtain a renewed certificate via a data connection from the central control platform on a regular basis. The certificate-based solution described in this manner in conjunction with the identity check at the mobile device has further advantages. The fundamental method according to the invention uses a data connection between the vehicle (access control unit) and the central control platform for verification of the rights. This connection is not always ensured, however, e.g. when driving in a region having a poor data network quality, or in underground parking garages. In this case, the method allows, on the basis of the certificate, the execution of an access control. On one hand, the user must identify himself to the mobile device, which is possible based on the data stored in the mobile device. If this verification is successful, valid certificate data from the central control platform are stored in the mobile device, the validity of which has not yet expired. It is possible with this data alone that certain privileges for accessing the vehicle are permitted by the vehicle, even though no direct communication with the central control platform can be initiated. On the part of the vehicle, the stored certificate data of the central control platform from earlier connections with the central platform are stored in the access control unit, and it can be verified that there is a valid certificate for the mobile access device when the identity check is successful. This certificate may already be sufficient, for example, such that a user can access the vehicle, and can drive for a limited distance, e.g. a maximum of 2 km, at a maximum speed, for example, of up to 50 km/h, within which distance a communication must be established between the access control unit and the central control platform. As soon as the connection is established, the complete check and the complete privilege allotment occur.

This concept of provisional trust based on a certification is possible because, on one hand, an identification of the user to the mobile device occurred, and this identity has also been shared with the vehicle, and on the other hand, a certificate-based provisional trust can be verified to the vehicle. A method of this type would not be possible if the identity could not be determined conclusively, as with conventional methods. Because this identity is a prerequisite, however, for any accessing of the certificate encrypted in the mobile device, the vehicle can tolerate a provisional trusting and privilege allotting. In this manner, the method according to the invention is better than conventional methods, which require a permanent connection to a central control platform, or trust a mobile access device, e.g. a key or a smartphone having an appropriate application, without requiring an identity verification of the user.

Numerous different certificates, e.g. for different car-sharing businesses, can be stored in a mobile device for this purpose. Furthermore, the privileges allocation can likewise occur in a variety of manners. For example, a prioritized privileges setting can be established for an identity, which fundamentally only allows for driving at a reduced speed, for example, independently of the actual vehicle unit. By way of example, it can be established for an identity of a driver of a certain age, that this driver may only drive, as a rule, at a maximum speed of, e.g., 120 km/h. This higher ranking privilege is shared with the vehicle, independently of querying car-sharing or fleet unit, such that one and the same vehicle, for example, is operated in different vehicle modes, depending on the accessing identity. This design is only possible in that there is a central control platform, having identity data, which in turn can be linked to different privilege settings, even at different locations. One and the same identity can be verified by means of different mobile devices, in different physical units. This is only possible because the identity of the person is verified in the mobile device, and not because the mobile access device (the smartphone) per se is recognized as a legitimate access means. Accordingly, the method is clearly better than such a method using a simple ignition key, because there is no checking of the identity in combination with the mobile device, and furthermore, a mobile access device can be blocked remotely in a simple manner for access to a vehicle, if it has been lost or stolen.

All of the communication executed in the method according to the invention can be carried out with conventional security measures, e.g. by establishing TLS connections in internet-based communication.

Now that a fundamental and general sequence of the method has been described in reference to FIG. 1, another exemplary embodiment shall be described with reference to the other figures.

FIG. 2 shows, schematically, the sequence of accesses to the central platform and the establishment and manipulation of data and links stored therein.

The central platform is created in accordance with this example, in a conventional MVC (Model View Controller) structure. A user can access the central platform via a web interface, in that he uses an appropriate browser on his local device. The web interface of the central platform is provided via a conventional web server. The data levels and external applications are separated from the web server level. The data are stored, by way of example, in a conventional database server (SQL server) on the data level.

Over the lifetime of a vehicle, which is also regarded as a physical unit in this example, the sequence of accesses over said lifetime is depicted from left to right in FIG. 2. During the production, the manufacturer first has physical control of the vehicle. The manufacturer also has access to the central platform at this point in time, in order to establish the initial entries for the vehicle. He issues entries for the vehicle and its access control device (SID: Smart Identity Device) and links the access control device with the vehicle. As a result of this linkage on the part of the manufacturer, a unique and permanent link between the vehicle system and the SID is established. The vehicle system accepts, accordingly, the control commands from the SID linked thereto. Following completion of the vehicle, and this link, the vehicle is transported to the dealer, as is shown in FIG. 2.

As soon as the vehicle has been delivered or transferred to a user, the dealer establishes this user as an identity in the central platform, via a web interface, and transfers the vehicle to the user in the central platform. The dealer thus establishes the link here, between the vehicle and its dedicated SID, and a user verification he has created.

Subsequently, the vehicle is physically transferred to the new owner. The owner established by the dealer has the right to establish other users as vehicle users in the central platform for the vehicles and SIDs linked to him. These other users, e.g. the owner himself, or members of his family (but also rental clients in the case of a vehicle rental agency), can be given certain rights by the vehicle owner via the web interface of the central platform. Furthermore, the vehicle owner can decide which users can access which rights, with which type of authentication measures, and whether the rights are subject to a time limit, thus becoming invalid at a specific point in time, or after a predetermined time period. For this, the question is to determine the manner in which a user may access the vehicle with a mobile access device, in this example a smartphone. For this, the vehicle owner can establish that merely a PIN is required for some types of access and rights, while for other rights (e.g. starting the vehicle), the recognition of biometric data (e.g. facial recognition, or fingerprint recognition) is required.

The vehicle can then be then transferred to respective users by the vehicle owner, as is depicted in FIG. 2 in the right-hand column. Such a vehicle user can then question the central platform, after a successful identity verification via his smartphone, for example, which rights he has with regard to a specific vehicle, but he cannot alter these rights.

It is apparent that different rights of access and for altering the data in the central platform are provided on the different levels. While the manufacturer can set both the vehicle and the associated SID, and link them, a dealer can no longer change the data for the vehicle and the SID. On the other hand, the dealer can create an owner for each vehicle, and link said owner to the already existing data of the vehicle and the SID. The owner, in turn, can control, create and alter the rights to the vehicle, and enter other users of the vehicle. Lastly, the user can only check his own rights in the central platform.

Each of the allocation procedures can be protected by different security concepts. In this exemplary embodiment, when a vehicle is assigned to a vehicle owner by the dealer, for example, the following procedure is initiated:

If the dealer enters in the central platform that a vehicle is to be connected to a newly created identity, the link is first stored in the database, which links the owner to the vehicle, and the SID assigned to the vehicle. Subsequently, a cellular telephone number for the vehicle owner is used to send a message (e.g. an SMS) from the central platform to this cellular telephone number. By means of this message, the vehicle owner is informed that a new vehicle has been assigned to him in the central platform. Furthermore, a message (e.g. another SMS) is sent to the SID linked to the vehicle to which it is assigned. In this message, the SID is requested (triggered) to establish a query to the central platform, in order to obtain an update of the access rights from the central platform. This type of trigger messages is also used when the granting of rights with regard to the respective SID in the vehicle were modified. A triggering of this type is more secure than a direct transmission of privilege settings, because a manipulation with a triggered query to the central platform is less probable than if the SID were to accept transmitted data directly.

In the exemplary embodiment, the SID is requested, by the received message, to establish a data connection to the central platform via a GSM module. Subsequently, updated data, including the data pertaining to the newly registered user, are downloaded to the SID. The SID encrypts and stores the access rights to the user in the registration on the part of the vehicle. The connection is secured via certificate checks, wherein root certificates from the central platform may already be stored in the SID by the manufacturer.

In an analogous manner, the granting of rights can be transacted at a later point of time by the user for his vehicle. As soon as the user changes the granting of rights to his vehicle in the central platform, the central platform sends a message to the relevant SID in the vehicle, which triggers an updating of the granting of rights in the SID of the vehicle.

It is also possible to link access rights to time limits or validity periods on the user level, thus to grant rights to other users of the vehicle with time restrictions. The issuing of the rights is fundamentally permanent for the vehicle owner, but the owner can, however, transfer the rights to users for a limited time period or for time intervals. These types of time limits are then sent to the SID in the vehicle by the central platform, and stored therein in an encrypted manner. By way of example, it may be provided that the SID does not allow the vehicle to be started up again after expiration of the user rights, or that it severely limits the maximum speed thereof.

In addition to this fundamental granting of rights within the central platform and the transference of rights from the central platform to the SID of a vehicle, the interaction between the user and his mobile device, in particular a smartphone, is also relevant.

An application is executed on the smartphone, which can transact a communication with the central platform as well as the SID of the vehicle. For this, an application is uploaded onto the vehicle owner's device by the dealer, or applications can be downloaded from the relevant platforms and online shops for various operating systems.

With the initial use of the application on a mobile device, the user is requested to enter a user name and a password. These data are used to calculate a hash value, which is transmitted to the central platform. The communication with the central platform can occur thereby via a typical transmission mode, e.g. via an (encrypted) http protocol. The central platform checks whether the user exists in its database, and likewise calculates a hash value on the basis of the data stored in the central platform regarding the user name and password. This is compared with the transmitted hash value. If this comparison of the user names and hash values results in a positive authentication, the central platform sends the SIDs and vehicles assigned to the user to the application. These data are stored by the application in an encrypted form on the smartphone for user identification.

After it has been established that the user is fundamentally verified, in order to safeguard the access rights, he is requested to teach different authentication methods to the smartphone. In particular, he is invited to create a unique PIN, to execute a sample gesture on the display of the smartphone, and to undergo facial recognition or fingerprint recognition.

These different authentication methods represent different secure steps for the access to different vehicle functions. Which authentications or which links of these authentications are sufficient for access to a vehicle function is defined in the central platform.

Subsequently, it is possible for the user of the application on the smartphone to first activate the vehicle for an access, which vehicle is reported to the application by the central platform as a vehicle assigned thereto. If the user selects a vehicle for activation, the application sends an activation query to the central platform, and the central platform creates a random code, which is valid for a limited time period. This random activation code is sent to the user's cellular telephone via a separate message. He must enter the activation code from the separate message in the application, and the application sends this activation code back to the central platform. In this manner, it is ensured that the user has actually received the message in the manner it has been stored in the central platform.

The central platform validates the activation code and sends a corresponding confirmation to the application on the smartphone. The application on the smartphone then creates a key pair, composed of a private and a public key, and creates a CSR (Certificate Signing Request), which is sent to the central platform. The central platform receives this CSR and generates an X509 certificate for the user and the SID/vehicle combination assigned to him. This means that for each user and each vehicle/SID combination, a certificate is created, which contains both the user ID as well as the ID for the SID in the certificate. These certificate data are sent back to the application on the smartphone, together with the Bluetooth addresses of the SID of the vehicle in question.

The data are received by the application, and stored in an encrypted form. The application then has the Bluetooth address of the dedicated SID, which enables a pairing of the application on the smartphone and the dedicated SID via Bluetooth.

The explanation of this exemplary embodiment given above describes all of the preparations that only have to be carried out once, or when modifying the access rights. Likewise, these procedures are to be executed in part when a vehicle owner or user wants to use a new mobile device, in order to access an existing vehicle.

In practice, the most common case by far is the everyday access to a vehicle with the system that has been set up once. For this, a short-range, wireless connection between the application on the mobile device and the SID in a vehicle is established. This pairing procedure occurs in the known manner, and in some cases, a confirmation of the coupling of these two devices may be initially necessary, depending on the type of operating system in use, and the settings on a smartphone. The smartphone already receives, however, the address data for the SID for a Bluetooth connection, when a vehicle and its dedicated SID are activated, such that a confirmation of this type can also be omitted.

If such a pairing has been successfully carried out, the user can access vehicle functions when the application is open, e.g. via a graphical interface, which is displayed on the touchscreen of a smartphone.

The vehicle functions may concern, for example, door locks, the ignition, heating or auxiliary heating, the opening of windows, the opening of the hatch, or the activation of lighting devices in or on the vehicle.

Figure 3A:
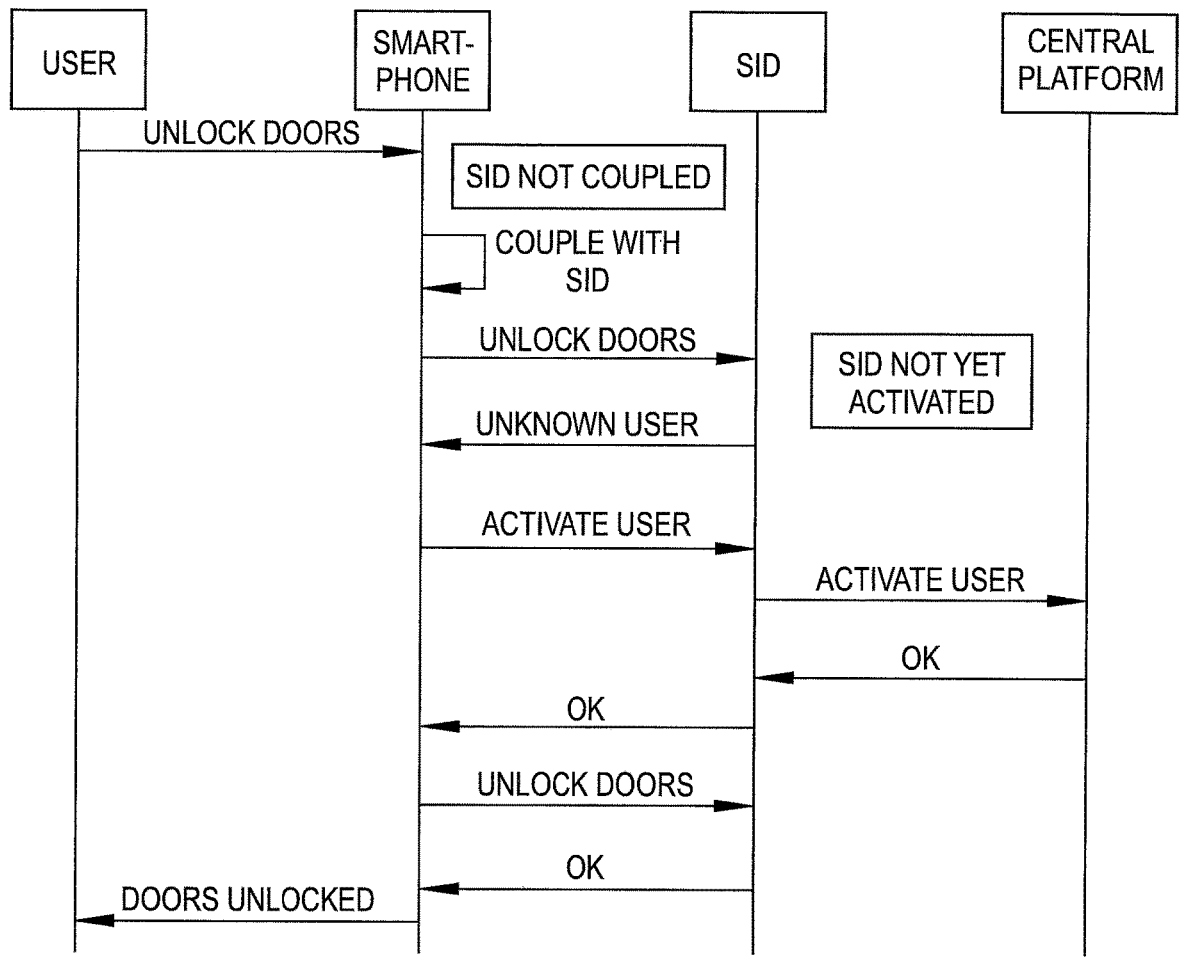
FIG. 3a shows a first schematic for an access to a vehicle in accordance with the second exemplary embodiment of the invention.

FIG. 3a shows, by way of example, an access sequence, when a user wants to access a vehicle function with his smartphone. This diagram is to be read from top to bottom.

The user opens the application for accessing his vehicle on his smartphone and selects the command for unlocking the doors. The application on the smartphone checks, on the basis of the stored data, which authentication by the user is necessary for this function, and requests this of the user, as long as the authentication in this step was not carried out when the application was initiated.

The application then establishes that it is not coupled with the SID of the activated vehicle, and first establishes a Bluetooth connection with the SID of the vehicle. A secure data connection is established via the Bluetooth connection, thus in a protocol level above Bluetooth. The application then sends the command to open the doors to the SID. In this example, the user is not yet known on the part of the SID (the SID is not yet activated for this user). The SID responds accordingly to the cellular telephone, that the user is unknown. The application then requests the SID to activate the user, upon which the SID issues an activation query to the central platform via the GSM module. The central platform confirms to the SID that the user is verified for the vehicle and has activated the SID, and transmits corresponding access data.

At this point, the SID confirms the activation of the user to the cellular telephone. The application on the smartphone then repeats the request for opening the doors, which is confirmed by the SID, and lastly, the doors are unlocked to the user.

Figure 3B:
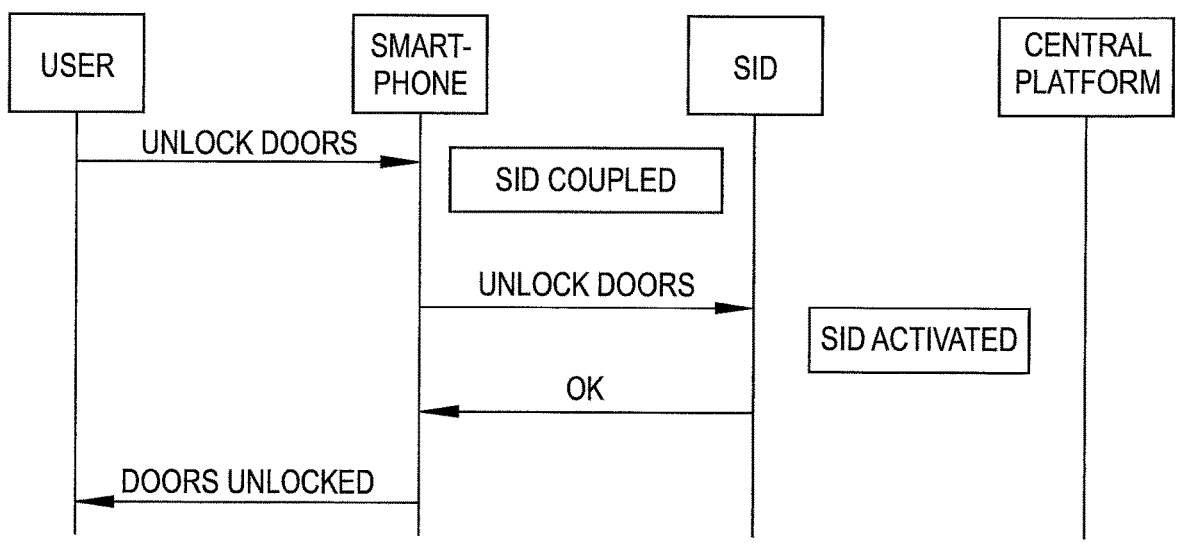
FIG. 3b shows a second schematic for an access to a vehicle in accordance with the second exemplary embodiment of the invention.

The scenario described above is the worst case scenario, in which the sequence can comprise all of the steps shown. Normally, however, when the user approaches the vehicle, a Bluetooth connection is already established, and the user is also already known to the SID. The process then runs with considerably fewer steps, and extremely quickly. This sequence is shown in FIG. 3b in the typical manner.

The method according to the invention enables an extremely secure management and flexible management of user rights, e.g. in vehicle fleets, but also with the use of other physical units, e.g. machines or suchlike. As a result of the separate communication channels between the SID in each physical unit to the central platform on one hand, and between the central platform and a mobile device (smartphone) on the other hand, the level of security is increased. Because, moreover, authentication of a user is still required on a mobile access device, in order to be able to access any data stored in an encrypted form in the mobile device at all, a further security step is added.

The encrypted memory in the mobile access device (in particular a smartphone) contains, for example, the data for activated vehicles, the data for the SIDs coupled to the vehicles, in particular their Bluetooth addresses and connection codes, the client certificates, and keys for the communication and the lists of the authentication methods when commands are requested, as well as user data, in particular the user names and passwords.

By way of example, the private key for the SID, a certificate for the SID, and a certificate and/or public key for the central platform, for example, are stored in an encrypted form in the memories of the SIDs for each vehicle.

The storage of these data in the devices enables a flexible type of access control. In particular, certificate data stored in the SID of a vehicle can be used to establish a temporary trust relationship between the vehicle and an accessing user with a smartphone. The application of the user contains, as described above, access data for an SID from the central platform. The data is encrypted thereby with a private key of the central platform. The SID in the vehicle contains data regarding the root certificate of the central platform. Even if the SID cannot access the central platform, a temporary access by a user to a vehicle can be ensured in any case by means of this structure. If, specifically, the SID can verify positively, that the data sent from the smartphone via the app to the SID has actually be signed by the central platform, based on the stored data pertaining to the root certificates, then a temporary trust relationship can be established. This is relevant in particular when, for example, a new user wants to gain access to a rental vehicle, but the rental vehicle is located in a region, for example, having poor mobile communications reception. If the certificate comparison is successful in the SID of the vehicle, the user can be given access to the vehicle, and the vehicle will retrieve the full rights of use, as soon as there is a network connection.

The invention claimed is:

1. A method for controlling access to physical devices, wherein vehicles are used as physical devices,
wherein each physical device is provided with an access control unit, which can disable and enable access to functions of the physical device,
wherein a central control platform is implemented, wherein wireless communication links can be established between the central control platform and a plurality of access control units,
wherein a mobile access device is provided, which can be carried by a user, and which can establish wireless communication links with the plurality of access control units and the central control platform,
wherein, when the user accesses the physical device using the mobile access device, an identity check of the user is carried out, wherein the user identifies himself to the mobile access device,
wherein, after a successful identity check, a wireless communication link is established between the mobile access device and the access control unit of the physical device,
wherein information concerning at least the identity of the user and a unique access data are transmitted to the access control unit from the mobile access device via the wireless communication link between the mobile access device and the access control unit,
wherein the access control unit determines an access rights of the user to the physical device and grants them to the user on the basis of the unique access data received and a further data received by the access control unit from the central control platform,
wherein on receipt of the information from the mobile access device, the access control unit sends the information on the identity of the user and a unique identifier of the access control unit itself via a first wireless communication link to the central control platform, whereupon the central control platform determines the access rights of the identified user to the physical device associated with the access control unit and the central control platform transmits an access permissions over the wireless communication link to the access control unit and the access control unit grants the access rights on the basis of the information,
wherein the central control platform knows the identity of a user, an identity of the mobile access device, and the identity of the access control unit of the physical device, all of these devices being identified by unique features,
wherein only the central control platform has all of the information regarding the unique features, which information is necessary for enabling access,
wherein the access control unit also receives and stores data from the central control platform in time intervals, independently of user accesses, wherein the access control unit determines and allots the access rights on the basis of this stored data and data received during an access attempt from the mobile access device, wherein said data stored in the access control unit of the physical device can be used to establish a temporary trust relationship between the physical device and the accessing user with the mobile access device, such that a temporary access by the user to the physical device can be ensured even when the physical device cannot access the central control platform, wherein a first communication link is established between the mobile access device and the central control platform, the central control platform transmits a first certificate data to the mobile access device, wherein the first certificate data is assigned to respective user identities, wherein a second communication link is established between the access control unit and the central control platform, wherein the central control platform transmits a second certificate data to the access control unit for storage, which allows an authentication and integrity checks of the first certificate data transmitted to the access control unit from the mobile access device, wherein when no data communication can be established with the central control platform, the access control unit verifies a validity of the first certificate data transmission from the mobile access device with stored second certificate data, and if the first certificate data is valid, grants a predefined selection of access rights to the identified user, and wherein the mobile access device comprises a mobile communications device, wherein the mobile communications device is a smartphone, on which an application is run, which executes both the identity check and the communication between the mobile communications device and the access control unit.

2. The method according to claim 1, wherein the access control unit also transmits information about a unique identification of the mobile access device to the central control platform.

3. The method according to claim 1, wherein the identification of the user to the mobile access device occurs on the basis of biometric data, in particular through an execution of facial recognition and/or an execution of voice recognition and/or a fingerprint recognition.

4. The method according to claim 1, wherein the central control platform transmits an identity confirmation to the mobile access device, wherein at least one part of the confirmation is encrypted with a private key of the central control platform, wherein the access control unit obtains a public key from the central control platform, with which the identity data received from the mobile access device can be verified.

5. The method according to claim 1, wherein the certification information transmitted to the mobile access device by the central control platform is provided with chronological sequence information, which specifies the period of validity of the certificate.

6. The method according to claim 1, wherein a unique certificate is issued for each combination of user and physical device, which is stored in the mobile access device.

7. The method according to claim 1, wherein the central control platform stores a unique address of a dedicated access control unit for each physical device, for establishing a short-range, wireless connection, in particular a Bluetooth connection, and transmits these addresses to the mobile access device.

8. The method according to claim 1, wherein the selection of access rights allows a limited use of the physical device, in particular including a temporal or functional limitation.

* * * * *